(12) United States Patent
Brauchli

(10) Patent No.: US 6,406,617 B1
(45) Date of Patent: Jun. 18, 2002

(54) SCUM EXTRACTION

(75) Inventor: Herbert Brauchli, Bilten (CH)

(73) Assignee: Cyklar AG, Kaltbrunn (CH)

( * ) Notice: Subject to any disclaimer, the term of this patent is extended or adjusted under 35 U.S.C. 154(b) by 0 days.

(21) Appl. No.: 09/676,676

(22) Filed: Oct. 2, 2000

(30) Foreign Application Priority Data

Oct. 8, 1999 (DE) ........................................ 199 48 549

(51) Int. Cl.$^7$ ............................................. B01D 21/24
(52) U.S. Cl. .................... 210/122; 210/242.1; 210/523; 210/540
(58) Field of Search .............................. 210/122, 242.1, 210/242.3, 523, 525, 540, 776, 800

(56) References Cited

U.S. PATENT DOCUMENTS

| | | | | |
|---|---|---|---|---|
| 3,447,683 A | | 6/1969 | Luce, Jr. ....................... | 210/83 |
| 3,810,546 A | * | 5/1974 | Oxenham ................. | 210/242.3 |
| 4,024,063 A | * | 5/1977 | Mori ........................ | 210/242.3 |
| 4,154,678 A | * | 5/1979 | Kole ........................ | 210/242.1 |
| 4,196,087 A | | 4/1980 | Gordon ................... | 210/242 S |
| 4,303,517 A | * | 12/1981 | Love et al. ................. | 210/528 |
| 4,695,376 A | * | 9/1987 | Astrom et al. ........... | 210/242.1 |
| 4,956,100 A | | 9/1990 | Mikkleson ............... | 210/717.6 |
| 5,106,494 A | * | 4/1992 | Norcross ................. | 210/242.3 |
| 5,154,835 A | * | 10/1992 | DeMichael ............... | 210/242.3 |
| 5,167,815 A | * | 12/1992 | Bachmann et al. ......... | 210/540 |
| 5,358,644 A | * | 10/1994 | Dennis ..................... | 210/242.1 |
| 5,378,376 A | | 1/1995 | Zenner ...................... | 210/776 |
| 5,958,240 A | | 9/1999 | Hoel .......................... | 210/608 |

FOREIGN PATENT DOCUMENTS

| | | |
|---|---|---|
| DE | 37 18 670 | 12/1988 |
| DE | 195 35 421 | 3/1997 |
| DE | 195 16 750 | 11/1998 |
| WO | 98/32515 | 7/1998 |

* cited by examiner

Primary Examiner—Christopher Upton
(74) Attorney, Agent, or Firm—Jacobson Holman, PLLC

(57) ABSTRACT

The invention relates to a sludge extraction, in particular for the extraction of scum in a sedimentation basin, and a process for selecting the sludge partitions. The sludge extraction of the invention comprises a float; a mixing unit to generate a fluid flow away from the sludge extraction; a catch tank with an overflow rim, which runs partially or completely around the sludge extraction; and a conveyor, which conveys the sludge, flowing into the catch tank, through an outlet line. The flow generated by the mixing unit moves the entire scum of the surface layer to the sludge extraction, where the scum can be collected. With the aid of this sludge extraction the scum and the light-weight sludge partitions can be extracted selectively and from over a large area.

16 Claims, 3 Drawing Sheets

SCUM EXTRACTION

BACKGROUND OF THE INVENTION

1. Field of the Invention

The invention relates to a sludge extraction system, in particular for the extraction of scum in a sedimentation basin. Furthermore, the invention relates to a process for selecting the sludge partitions in accordance with their sedimentation properties in a sedimentation basin.

2. Prior Art

Mixtures of water and light materials, like oil or fat, exhibit a layer of scum on the surface of the water. Even in the biological treatment of sewage significant layers of scum can form in the presence of specific bacteria. In so doing, the air bubbles, fed in for sewage aeration, bind with the biological sludge and result in a viscous layer of scum that floats on the surface of the water.

In many areas these layers of scum cause problems, because they coat the basin walls, cause odors and a layer of ice to form, and in extreme cases the scum can spill over the basin crest. In addition, the targeted removal of the light materials is often desirable, since it facilitates the subsequent treatment. The scum is to be separated off in such a manner that large quantities of water are not simultaneously extracted.

There exist a plurality of different systems for extracting the layers of scum. In so doing, the problem is not so much the extraction of the layer of scum itself as rather the problem of conveying the light material to be extracted to the site of extraction.

The extraction systems are frequently stationarily installed. They remove the scum in the immediate vicinity of the extraction point, as desired, but the scum that is somewhat further away remains unaffected.

In the secondary sedimentation basin of sewage treatment plants, floating scum extraction systems are combined with the scrapers in the secondary sedimentation basin. In so doing, the floating scum extraction system reaches the entire basin surface in each scraping step. Since, however, the scraping motion, has to be very slow, the relative motion between the scum and the scraper is often inadequate to move the scum into the extraction system. In addition, mechanical devices must then convey the scum into channels and funnels.

SUMMARY OF THE INVENTION

The object of the invention is to provide a sludge extraction system and a process for selecting sludge partitions that allow light-weight sludge partitions to be extracted selectively and over a large area.

This problem is solved with a sludge extraction that comprises a float; a mixing unit to generate a fluid flow away from the sludge extraction; a catch tank with an overflow rim, which runs partially or completely around the sludge extraction; and a conveyor, whereby the conveying unit conveys the sludge, flowing into the catch tank, through an outlet line.

The float causes the sludge extraction to float to the surface of the water, thus extracting the floating scum and the sludge near the surface. The mixing unit generates a fluid flow away from the sludge extraction. This results in the formation of a convection current in the sedimentation basin, which on the surface of the water results in a flow from all sides in the direction of the sludge extraction. Owing to this flow all of the scum of the surface layer moves in the direction of the sludge extraction and can be collected there. In contrast to the prior art sludge extraction systems, it is possible to remove the scum and the light-weight sludge components not only locally but over a large over.

To collect the sludge there is catch tank exhibiting an overflow rim that runs partially or completely around the sludge extraction. The scum to be moved in the direction of the sludge extraction flows in free overfall over the overflow rim into the catch tank. From there it is drained through the outlet line by means of a conveyor. The overflow rim prevents the quantities of water, extracted together with the scum, from getting too large. It is possible with the compact sludge extraction of the invention to remove the layers of scum and other light-weight sludge partitions selectively and over large areas.

According to an advantageous embodiment of the invention, the catch tank is designed as a catch channel that runs completely or partially around the float.

Owing to the generated flow, the scum moves from all sides in the direction of the sludge extraction. Therefore, it is advantageous to be able to collect the sludge from as large an angular area as possible around the sludge extraction. With the aid of a catch channel, which runs completely or partially around the float, the bulk of the sludge is collected. At the same time it enables a compact design of the sludge extraction.

It is advantageous for the height of the overflow rim to be adjustable relative to the water level.

The deeper the overflow rim is positioned, the higher is the percentage of water extracted together with the scum. At the same time, however, it can be guaranteed that the complete layer of scum is extracted. At the same time, however, the pump capacity demanded of the conveying unit must be taken into consideration, because the hydraulic capacity of the extraction device must always be greater than the quantity of incoming scum. It is possible to selectively remove the scum through a suitable adjustable of the overflow rim, for example, with the aid of spindle screws.

Furthermore, it is advantageous for the catch tank to exhibit an incline, whereby the sludge, flowing into the catch tank, moves along the incline in the direction of the conveying unit.

The sludge, which falls from all sides here into the catch tank or the catch channel, can be conveyed to an extraction funnel. In this manner all of the sludge that is falling in can be pumped off by means of the conveying unit.

According to another advantageous embodiment of the invention, the conveying unit is a submersible pump. Such submersible pumps are designed for use under water; and, therefore, such a submersible pump can be mounted below the catch channel. This option of being able to mount the pump underneath the water level enables a compact design of the sludge extraction.

According to another advantageous embodiment of the invention, the mixing unit comprises an agitator, with which the fluid flow, directed away from the sludge extraction, can be generated.

Such an agitator usually comprises a propeller, whose drive shaft is driven by an (electric) motor. Whereas the design of the propeller determines the flow profile generated, the rate of flow can be set by means of the speed of the drive motor. Such an agitator constitutes the simplest and least expensive possibility of generating the desired fluid flow.

Another advantageous embodiment of the invention provides a frequency converter, with which the speed of the agitator can be set.

The higher the speed of the propeller is chosen, the stronger is the convection current generated in the sedimentation basin. Whereas with a weak convection current only the layer of scum and light-weight sludge particles in the vicinity of the water surface can be extracted, a stronger convection current can bring about that also heavier sludge particles are swirled up so as to form layers near the surface. Therefore, as the speed of the agitator increases, higher densities of sludge partitions can also be extracted. In this manner it is possible to determine the composition of the sludge extracted by the rotational frequency of the agitator.

This is especially significant if the sludge extraction of the invention is used in biological sewage clarification, and in particular in activation tanks. In the activation tank, high molecular sewage particles are decomposed with the aid of bacteria. These bacteria need oxygen; and, therefore, the activation tank must be sufficiently aerated. The biomass in the activation tank is called the socalled "activated sludge". Since the bacteria are constantly multiplying, the mass of activated sludge also increases. Therefore, not only the scum but also a part of the activated sludge is also being continuously extracted from the activation tank. When the sludge extraction of the invention is used in an activation tank, one can determine through the choice of the speed of the agitator to what extent not only the scum but also the lighter weight components of the activated sludge are also being extracted.

A preferred embodiment of the present invention provides means for fixing the float in a horizontal position. The components of the mixing unit and in particular the submersible pump ensure uniform loading of the float. The result of this state is that the sludge extraction lies obliquely in the water. However, it is necessary for the sludge extraction to function that the height of the overflow rim be constant over the periphery with respect to the water surface. Hence it is advantageous to provide means that fix the sludge extraction in a horizontal plane.

There can be two parallel guide elements, which are pivot mounted on the sludge extraction and on a fastening device, whereby the distance between the swivel axes on the sludge extraction and on the fastening device is identical, and whereby the connecting lines of the swivel axes run parallel on the sludge extraction and on the fastening device. The guide elements are configured in the sense of a parallelogram, thus guaranteeing that the horizontal alignment of the sludge extraction and the float is maintained independently of the height of the water level.

It is especially advantageous for at least one of the guide elements to be formed by the outlet line. In this manner an especially simple and inexpensive design is obtained.

Another embodiment of the invention provides that at least one of the guide elements is hinged at two points respectively on the sludge extraction and on the fastening device. The wall sided positioning at two points and the corresponding counter positioning at the float prevent the sludge extraction from moving sideways should a capsizing instance occur. It is thus guaranteed that the position of the sludge extraction in the water is stable.

The described sludge extraction can be used, on the one hand, to simultaneously extract scum and, on the other hand, sludge partitions can be selected according to their sedimentation properties with such an extraction. The stronger the generated convection current is chosen, the higher is the percentage of removed heavy sludge particles. Inversely if the current is weak, only the lightest sludge particles can be extracted.

The process of the invention for selecting sludge partitions in accordance with their sedimentation properties in a sedimentation tank comprises the following steps. A fluid flow is generated in the sedimentation tank. By means of a sludge extraction, which exhibits an overflow rim just below the water level, a sludge partition exhibiting the predetermined sedimentation properties is collected and then carried away.

In contrast to the extraction devices described in the prior art, it is possible to extract the scum and the lighter weight sludge partitions over a large area with the aid of the fluid flow generated in the sedimentation tank. In so doing, only sludge particles having specific sedimentation properties are collected and carried away. The collected sludge partition can be affected by varying the generated fluid flow, especially by varying the rate of this flow.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other details and advantages of the present invention are explained in detail with reference to several embodiments depicted in the drawings.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
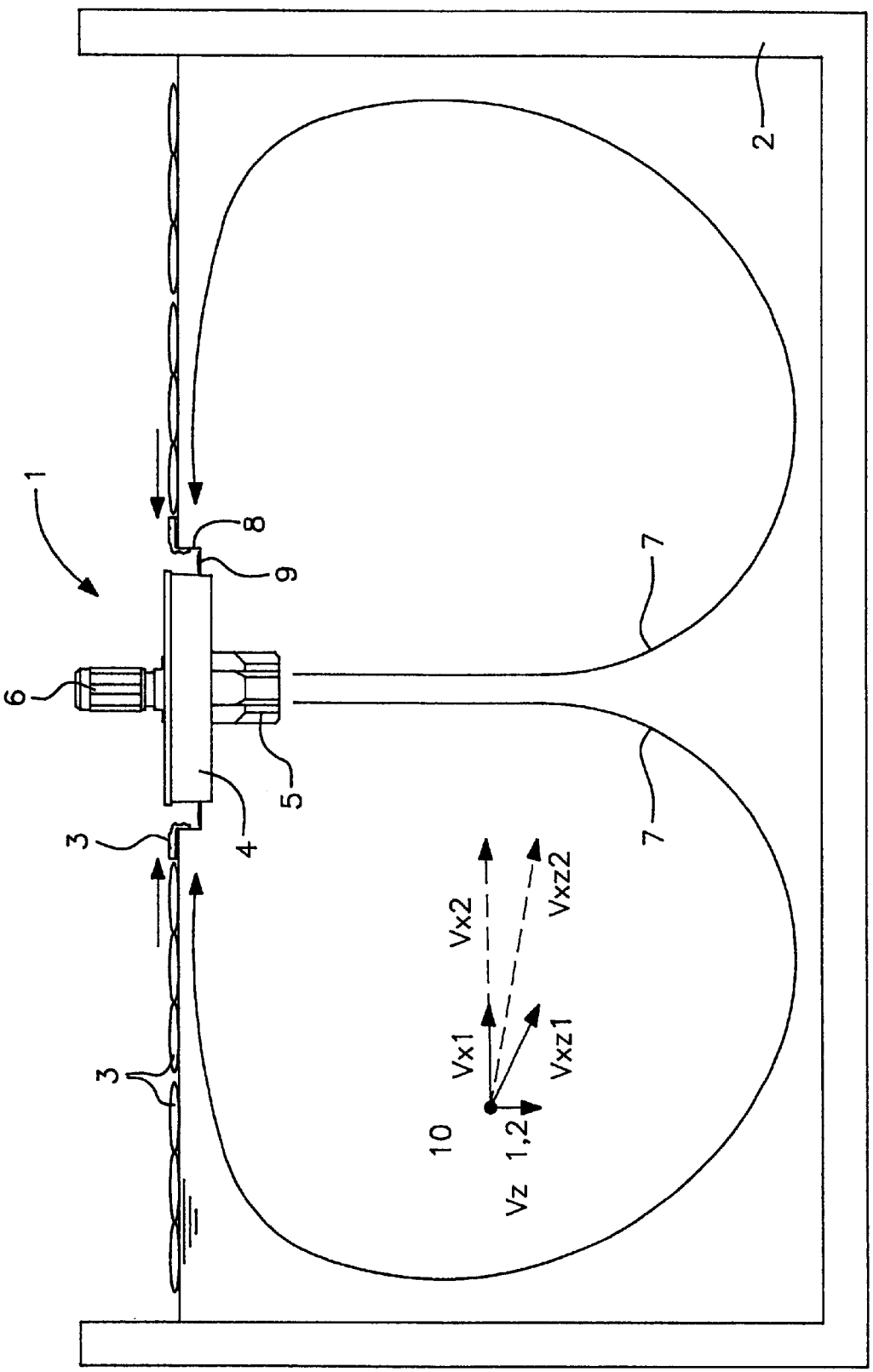
FIG. 1 is an overview of the operating mode of the sludge extraction of the invention.

FIG. 1 gives an overview of the operating mode of the sludge extraction system 1 according to the invention. The sludge extraction system 1 is in a sedimentation basing 2, which is filled with water and sewage sludge and which is typically an activation tank. At the surface of the water there is a layer of scum 3. The sludge extraction system 1 exhibits a float 4 and a mixing unit 5. The mixing unit 5 is designed as an agitator, wherein the propeller of the agitator is driven by means of a drive shaft using a motor 6. It is advantageous to use an electric motor. The rotating propeller of the agitator 5 generates a fluid flow 7, directed away from the sludge extraction system 1. Fluid flows from the layers near the surface in the direction of the propeller, thus generating a convection current, which results in the scum 3 moving from all sides to the sludge extraction system 1.

A catch channel 9, which is provided with a height adjustable overflow rim 8 on the outside, runs runs completely or partially around the float 4.

The sludge flows in free overflow over this overflow rim into the channel 9. The height of the overflow rim 8 can be adjusted relative to the water level with spindle screws. In this manner it can be determined how much water is collected together with the scum in the catch channel 9.

FIG. 1 also depicts the speed components of a flake of sludge 10 in the x and z direction. The flake of sludge exhibits a higher density than the water and would, therefore, sink to the bottom of the sedimentation basin 2. Owing to the fluid flow 7 generated by the mixing unit 5, the flake of sludge is moved in the direction of the water surface. At a low speed the flake of sludge moves only at the low speed $v_x1$ in the direction of the sludge extraction 1. At the same time, however, it decreases at the speed $v_z1$. The resulting speed $v_{xz}1$ drops, therefore, relatively sharply to the low end. Thus at a low rate of flow the flake of sludge 10 does not flow into the catch channel 9. The situation is different, however, at higher rates of flow. An example is the horizontal speed $v_x2$, at which the resulting speed $v_{xz}2$ is produced. By suitably adjusting the overflow edge 8, the flake of sludge can flow in this case into the catch channel 9. Thus, at a low rate of flow only the scum and the lightest sludge partitions can be extracted, whereas an increase in the rate of flow makes it possible to extract also heavier and, therefore, sludge particles that sink quickly.

Figure 2:
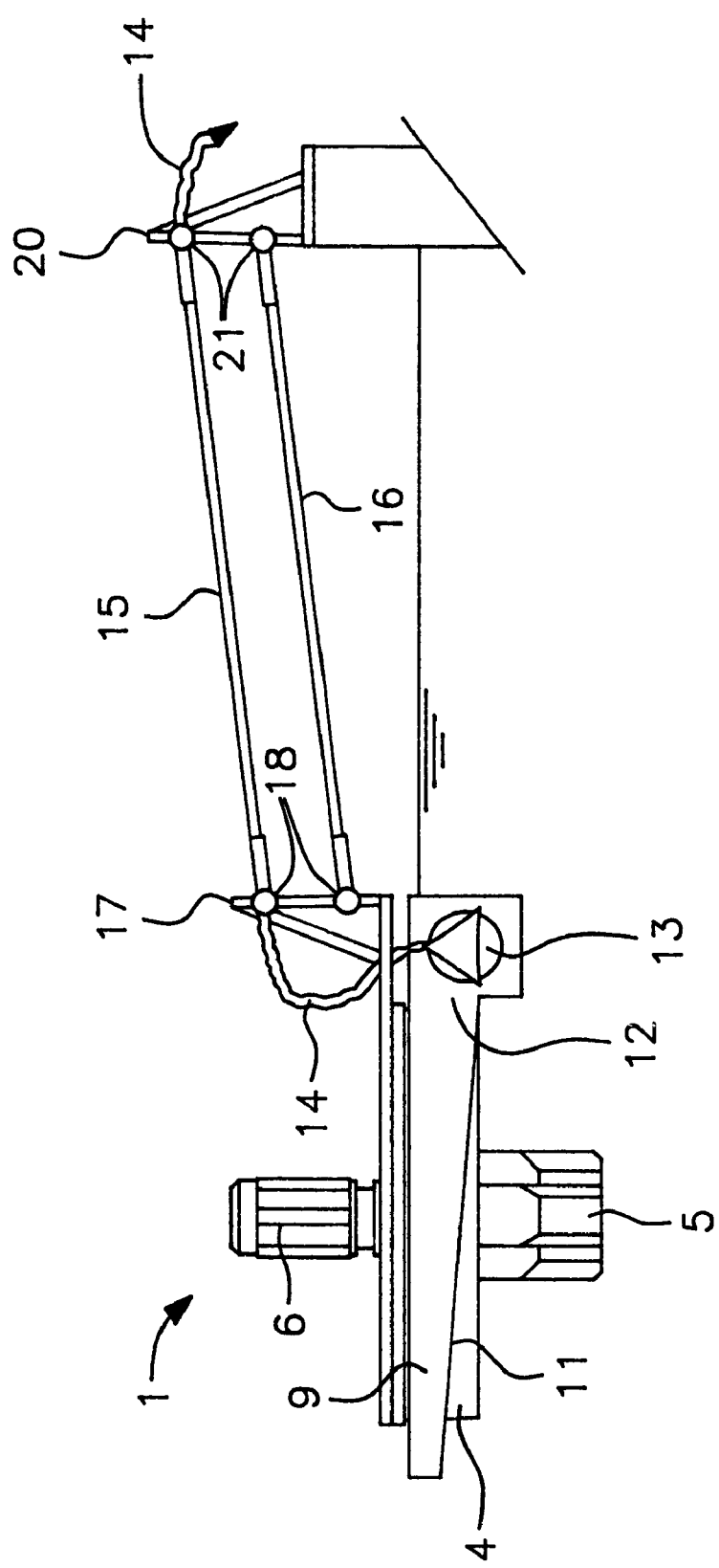
FIG. 2 is a side view of the sludge extraction, from which is especially evident how the sludge extraction can be stabilized in the water.

FIG. 2 shows how the sludge collected in the catch channel 9 can be pumped off. For this purpose there is an inclined slope 11 on the bottom of the catch channel 9, so that the sludge slides in the direction of the extraction funnel 12. At the same time the hydraulic capacity of the channel is always greater than the quantity of inflowing scum. In the extraction funnel 12 the scum is extracted from the system with a conveying unit 13, preferably a submersible pump, through an outlet line 14, formed as a pipe or hose line.

If the conveying unit 13 and the channel 9 are not centered, there is the problem that the float will no longer be in a position of equilibrium. Then it would not be possible to accurately adjust the submersion deep of the overflow. FIG. 2 shows how the sludge extraction can be guided in such a manner over a holding device that the float 4 can easily track any change of the water level in the basin. In addition, there are two guide elements 15 and 16 that are hinged to a holder 17, located on the sludge extraction 1, and on a basin rim sided fastening device 20. Swivel axes 18, which run at a right angle to the extraction side, and basin rim sided swivel axes 21 enable the sludge extraction 1 to be moved in the z direction. To this end, the distance between the swivel axes 18 on the holder 17 is identical to the distance between the swivel axes 21 on the fastening device 20. The connecting lines of the swivel axes 18 on the holder and the swivel axes 21 on the fastening device run parallel. Therefore, the holder 17, the guide elements 15 and 16 and the fastening device 20 form a parallelogram, a state that guarantees a fixing of the sludge extraction 1 in a horizontal plane. The principle of the parallelogram is also used, e.g. with drawing boards, where the rulers always maintain their direction irrespective of the respective position.

In addition, the wall sided positioning (20) at two points and the corresponding counter positioning (17) at the float for at least one of the guide elements 15, 16 also prevent lateral instability, should an instance of capsizing occur.

One leg 15 of the parallelogram can be designed as an outlet line 14, over which the scum is drained. Over the other leg 16 of the parallelogram the current supplied by the mixing unit 5 and the submersible pump 13 can be guided.

Figure 3:
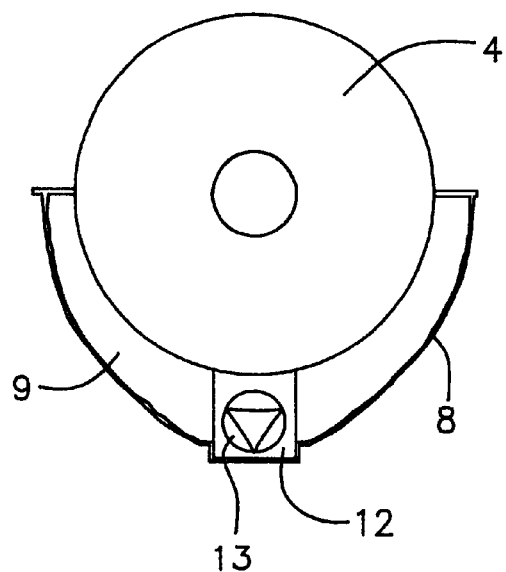
FIG. 3 depicts an embodiment of the invention, where the catch channel runs only partially around the float.

FIG. 3 is a top view of the sludge extraction 1 of the invention. The catch channel 9 runs only partially around the float 4. Scum, flowing over the overflow rim 8 into the channel 9, slides in the direction of the extraction funnel 12 and is detected there by the submersible pump 13 and pumped off.

Figure 4:
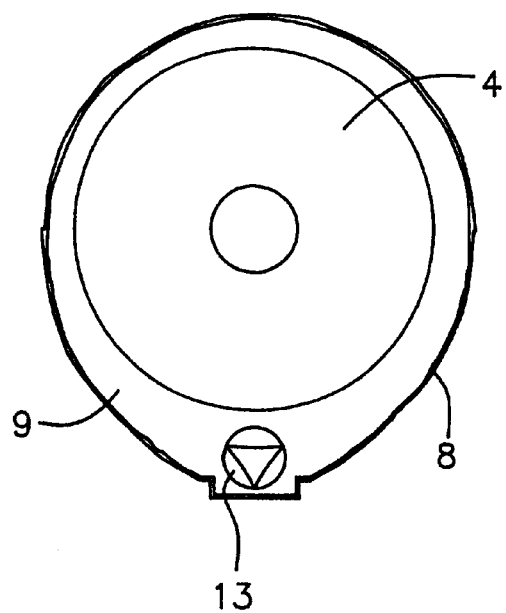
FIG. 4 depicts an embodiment of the sludge extraction, where the catch channel runs completely around the float.

FIG. 4 is a top view of an embodiment of the sludge extraction 1, where the catch channel 9 runs completely around the float 4. Thus, sludge can fall from all directions over the overflow edge 8 into the catch channel 9 and be pumped off.

According to the invention, not only the scum but also the excess sludge can be extracted from the sedimentation basin. The excess sludge, which is usually extracted in the secondary sedimentation tank, constitutes the end product of the biological sewage purification. The result of extracting the excess sludge together with the scum on the surface of the basis of the thoroughly mixed sedimentation basin is a selection of the extracted sludge, during which process the light-weight sludge is preferably extracted.

In the activation basin there are always sludge particles, which are significantly lighter than the others. If there are a lot of light-weight particles in the sedimentation basin, then it is frequently not possible to separate the sludge completely from the sewage in the secondary sedimentation step. The sludge gets into the runoff; it is called the bulking sludge.

If the excess sludge in a thoroughly mixed activation basin is extracted on the surface of the basin with the device of the invention, lighter sludge is preferably extracted as a consequence of the flow characteristics. In this manner the heavier sludge can accumulate, as desired, in the basin. The degree of selection can be controlled by the mixing intensity. The lower the rate of flow, the more lighter particles can be extracted. The mixing intensity is adjusted by means of the connect load or the speed of the propeller.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A scum and sludge extractor comprising:
   a sedimentation tank in which is located said extractor and which is filled with water and sewage sludge;
   a float incorporating a mixing unit positioned in said sedimentation tank on the surface of said water and sewage sludge;
   a catch tank which is attached to said float and provided with a height adjustable overflow rim which runs at least partially around said float; said mixing unit being adapted to generate a fluid flow within said sedimentation tank towards said catch tank;
   an extractor funnel for collecting said scum and sludge collected in said catch tank;
   a conveyor unit for pumping said scum and sludge in said extractor funnel and for conveying said scum and sludge through an outlet line;
   holding member for locating said float and said catch tank so that said float tracks any change of a water level in said sedimentation tank; and
   said holding member comprising a parallelogram linkage including said outlet line.

2. The scum and sludge extractor according to claim 1 wherein said holding member comprises two guide elements which are hinged at their outer ends to a float frame located in said float, one of said guide elements being designed as said outlet line and at their inner ends to a tank frame located on a tank rim of said sedimentation tank, parallel swivel axes being provided for enabling said float together with said catch tank to be moved vertically, a distance between said swivel axes being a same vertical distance apart.

3. The scum sludge extractor according to claim 1, wherein said overflow rim extends partially around said float.

4. The scum and sludge extractor according to claim 1, wherein said overflow rim extends completely around said float.

5. The scum and sludge extractor according to claim 1, wherein said catch tank comprises a catch channel having a bottom provided with an inclined slope for conveying said scum and sludge in a direction of said extractor funnel.

6. The scum and sludge extractor according to claim 1, wherein said conveyor unit includes a submersible pump.

7. A scum and sludge extraction system for extracting scum and sludge from a sedimentation basin having an outer wall and a bottom filled with water, scum and sludge, said extraction system comprising:
   a variable speed mixing unit for agitating the water, scum and sludge at different speeds and generating a circular fluid flow of the water, scum and sludge away from said mixing unit towards said bottom;
   a float having an outer edge for surrounding and positioning said mixing unit to extend into said sedimentation basin, said float maintaining floatation on said water, scum and sludge;
   a catch tank attached to said outer edge of said float, and including a height adjustable overflow rim, said overflow rim running at least partially around said outer edge of said float for catching said water, scum and sludge when said circular fluid flow moves said water, scum and sludge away from said bottom of said sedimentation basin towards said catch tank;
   an extraction conduit attached to said outer edge of said float for extracting said scum and sludge from said water collected in said catch tank;
   a holding member said float and said catch having an outlet line for transporting said extracted scum and sludge over said outer wall, said holding member locating said float and said catch tank in said sedimentation basin to track any change of a water level in the sedimentation basin; and
   a conveying unit for conveying said scum and sludge said extraction conduit through said outlet line of said holding member.

8. The scum and sludge extraction system according to claim 7, wherein said holding member comprises two guide elements having inner ends and outer ends, said inner ends for hinging to said outer edge of said float, and said outer edge defining a frame.

9. The scum and sludge extraction system according to claim 8, wherein one of said guide elements forming said outlet line and at said outer ends attaching to a frame located on said outer wall of said sedimentation basin.

10. The scum and sludge extraction system according to claim 8, wherein said holding member including equal distance parallel swivel axes for enabling said float and said catch tank to move vertically.

11. The scum and sludge extraction system according to claim 8, wherein said catch tank comprises a catch channel having a bottom, said bottom having an inclined slope for conveying the scum and sludge into said extractor funnel.

12. The scum and sludge extraction system according to claim 8, wherein said conveyor unit includes a submersible pump.

13. The scum and sludge extraction system according to claim 8, wherein said extraction conduit is funnel shaped.

14. The scum and sludge extraction system according to claim 8, wherein said holding member forms a parallelogram linkage from said edge of said float to said outer wall of said sedimentation basin.

15. The scum and sludge extraction system according to claim 7, wherein said variable speed mixing unit agitating the water, scum and sludge at different speeds to generate different circular fluid flows of the water, scum and sludge, and, based on said different speeds, said height adjustable overflow rim catching different amounts of said water, scum and sludge.

16. The scum and sludge extraction system according to claim 7, wherein said overflow rim extends completely around the float.

* * * * *